(12) United States Patent
Walker et al.

(10) Patent No.: US 9,049,592 B2
(45) Date of Patent: Jun. 2, 2015

(54) TECHNIQUES FOR KEY DERIVATION FOR SECURE COMMUNICATION IN WIRELESS MESH NETWORKS

(75) Inventors: Jesse Walker, Portland, OR (US); Meiyuan Zhao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 11/857,345

(22) Filed: Sep. 18, 2007

(65) Prior Publication Data

US 2008/0069348 A1     Mar. 20, 2008

Related U.S. Application Data

(60) Provisional application No. 60/845,634, filed on Sep. 18, 2006.

(51) Int. Cl.
| | |
|---|---|
| *H04L 9/08* | (2006.01) |
| *H04W 12/04* | (2009.01) |
| *H04W 84/18* | (2009.01) |

(52) U.S. Cl.
CPC ............. *H04W 12/04* (2013.01); *H04L 9/0838* (2013.01); *H04W 84/18* (2013.01)

(58) Field of Classification Search
CPC ..... H04L 9/0838; H04W 12/04; H04W 84/18
USPC ........................ 380/46, 277; 726/2
See application file for complete search history.

(56) References Cited

U.S. PATENT DOCUMENTS

| | | | | |
|---|---|---|---|---|
| 7,734,052 | B2 * | 6/2010 | Braskich et al. | 380/277 |
| 2004/0228490 | A1 | 11/2004 | Klemba et al. | |
| 2007/0147620 | A1 | 6/2007 | Zheng et al. | |
| 2007/0162751 | A1 * | 7/2007 | Braskich et al. | 713/169 |
| 2007/0192600 | A1 | 8/2007 | Wong et al. | |
| 2007/0206537 | A1 | 9/2007 | Cam-Winget et al. | |
| 2008/0063204 | A1 * | 3/2008 | Braskich et al. | 380/270 |
| 2008/0065884 | A1 * | 3/2008 | Emeott et al. | 713/168 |

FOREIGN PATENT DOCUMENTS

JP     2006-60578     3/2006

OTHER PUBLICATIONS

PCT Search Report and Written Opinion for International Patent Application No. PCT/US2007/078803 mailed May 27, 2008, 11 pgs.
First Office Action for Chinese Patent Application No. 2007800342774 mailed Jul. 1, 2011, 3 pgs.
Second Office Action for Chinese Patent Application No. 2007800342774 mailed Dec. 20, 2011, 2 pgs.

(Continued)

*Primary Examiner* — Kambiz Zand
*Assistant Examiner* — Benjamin Kaplan
(74) *Attorney, Agent, or Firm* — Blakely, Sokoloff, Taylor & Zafman LLP

(57) ABSTRACT

Key derivation procedures and key hierarchies compatible with the mesh link establishment protocol for use in a mesh network. A single cryptographic primitive may be utilized, which is a key derivation function, denoted as $\text{kdf}_K$, where K is a cached pairwise master key. The result of the function $\text{kdf}_K$ may be used to derive the keys used to secure both link establishment and the data subsequently exchanged over the link.

12 Claims, 3 Drawing Sheets

(56) References Cited

OTHER PUBLICATIONS

Summary of "Notice of Reasons for Rejections" for Japanese Patent Application No. 2009-524825 mailed Sep. 15, 2011, 9 pgs.
Masumoto, Hiroyuki, et al., "Cipher Key Distribution for COMNUS", *Proceedings of the 1992 IEICE Fall Conference, The Institiue of Electronics, Information and Communication Engineers*, Sep. 15, 1992, Part 2, B-179, p. 180.
Sakata, Shiro, et al., "Mobile Ad Hoc Networks adn Wireless LAN Mesh Networks", *The IEICE Transactions B (Japanese Edition), The Institute of Electronics, Information and Communication Engineers*, Jun. 1, 2006, Vo J89-B, No. 6, pp. 811-823.

\* cited by examiner

TECHNIQUES FOR KEY DERIVATION FOR SECURE COMMUNICATION IN WIRELESS MESH NETWORKS

This application claims the benefit of U.S. Provisional Patent Application No. 60/845,634 filed Sep. 18, 2006.

TECHNICAL FIELD

Embodiments of the invention relate to wireless communications. More particularly, embodiments of the invention relate to security in wireless mesh networks.

BACKGROUND

IEEE 802.11s is an amendment being developed to the IEEE 802.11 standard that, when completed, is intended to provide protocols to add mesh capabilities to the wireless local area network (WLAN) standard. The mesh architectures allow the data to be forwarded on paths consisting of multiple wireless hops. IEEE 802.11s was chartered to improve the throughput of data transmission by adding the mesh capabilities without compromising security and without degrading quality of service (QoS) across transitions. One of the advantages that may result from this amendment is ability to provide video streaming over the mesh network.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Video stream distribution imposes constraints on mesh network design in that peer links on the mesh must be established regardless of noise on Wi-Fi media. There has been concern as to whether the secure peer link establishment process can complete in a short enough time frame to meet the constraints imposed by video stream distribution.

One technique is to expedite the procedure of establishing secure peer links by overlaying security handshake on top of the basic peer link establishment protocol. This scheme may permit the Wireless LAN Mesh Points (MPs) to omit certain steps in the secure link establishment process if they have a priori knowledge and control of a previously established Pairwise Master Key (PMK). This approach may enhance the user experience of video stream applications on the mesh given that MPs may lose connectivity on certain links frequently. In one embodiment, the techniques described herein utilize keys at a much earlier stage of the link establishment process than is done using the 802.11i key hierarchy, meaning that the 802.11i keying procedure cannot work correctly with the 802.11s requirements.

Figure 1:
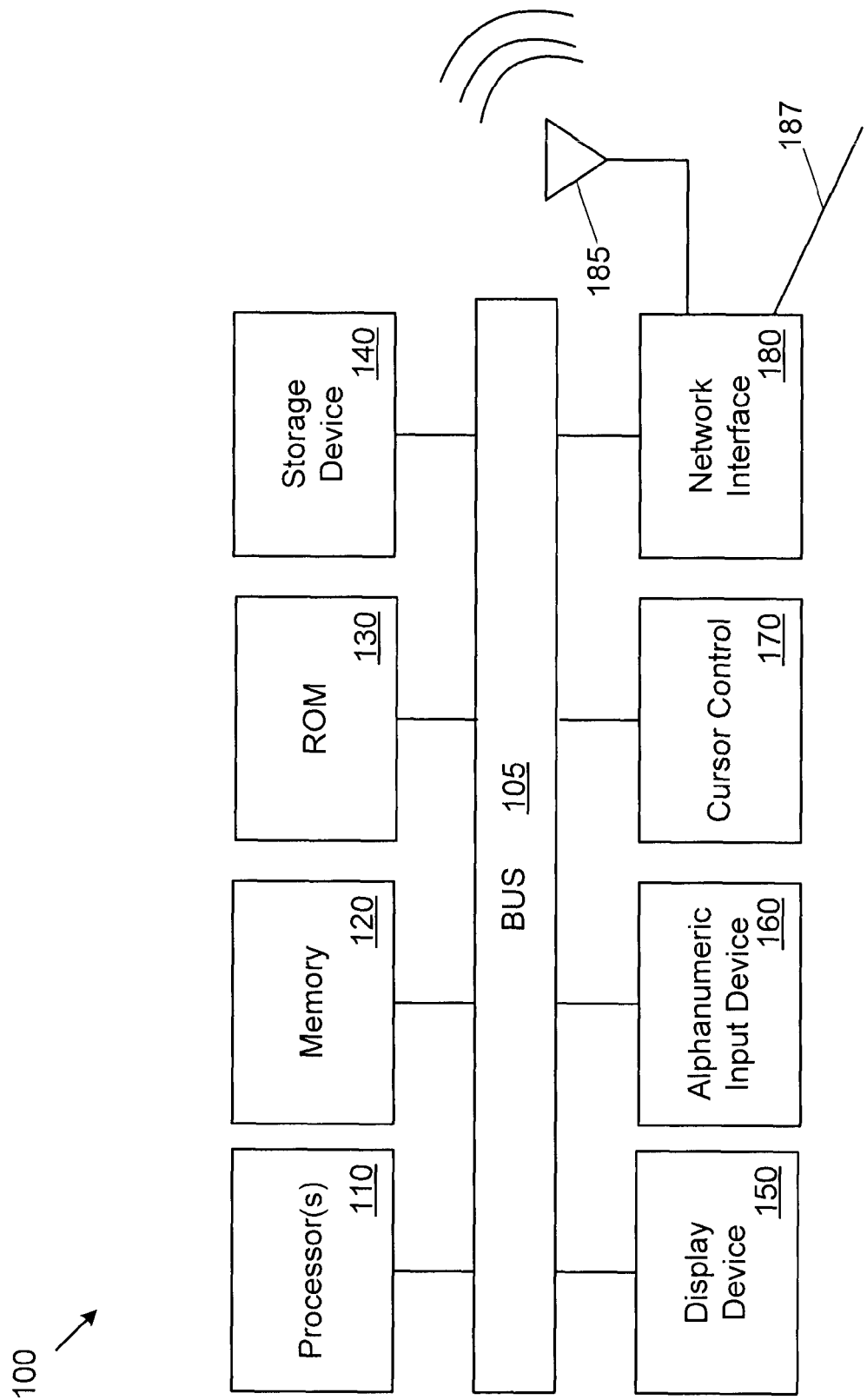
FIG. 1 is a block diagram of one embodiment of an electronic system.

Each mesh point of a mesh network may be an electronic system. FIG. 1 is a block diagram of one embodiment of an electronic system. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 100 includes bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11 standards, and/or the wireless network interface may provide access to a personal area network, for example, by conforming to Bluetooth® standards. Bluetooth® is a registered trademark owned by Bluetooth SIG, Inc. Other wireless network interfaces and/or protocols can also be supported.

IEEE 802.11 standards may include, for example, IEEE 802.11b, IEEE 802.11g as well as other IEEE 802.11 standards no specifically mentioned herein. IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Described herein are key derivation procedures and key hierarchies compatible with the mesh four-message link establishment protocol for use in a mesh network. In one embodiment, a single cryptographic primitive may be utilized, which is a key derivation function, denoted as $kdf_K$, where K is a cached pairwise master key. In one embodiment, $kdf_K$ may be used to derive the keys used to secure both link establishment and the data subsequently exchanged over the link.

The key derivation process may be accomplished between two mesh points. A first mesh point, which will be referred to as mesh point A, and identified by its IEEE 802.11 MAC address MPA. A second mesh point, which will be referred to as mesh point B, and identified by its IEEE 802.11 MAC address MPB. In one embodiment, mesh point A and mesh point B may maintain a cached pairwise master key K. As defined in IEEE 802.11i, the pairwise master key K may be an authorization token whose possession demonstrates authorization to access the wireless communication channel. In alternate embodiments, identification may be achieved by information other than the MAC address.

This description that follows assumes that a pairwise master key K is shared only between mesh point A and mesh point B. The description further assumes K was established in some secure fashion that is outside the scope of this description and may be accomplished in any manner known in the art.

Because K is known exclusively by A and B, it can be used to authenticate B to A and vice versa. Hence, the technique described herein assumes that both A and B understand the intended purpose for K, which includes to establish new links between A and B. In one embodiment, the IEEE 802.11 MAC addresses can be lexicographically ordered, so the concept of larger, smaller, min, and max are well-defined.

Figure 2:
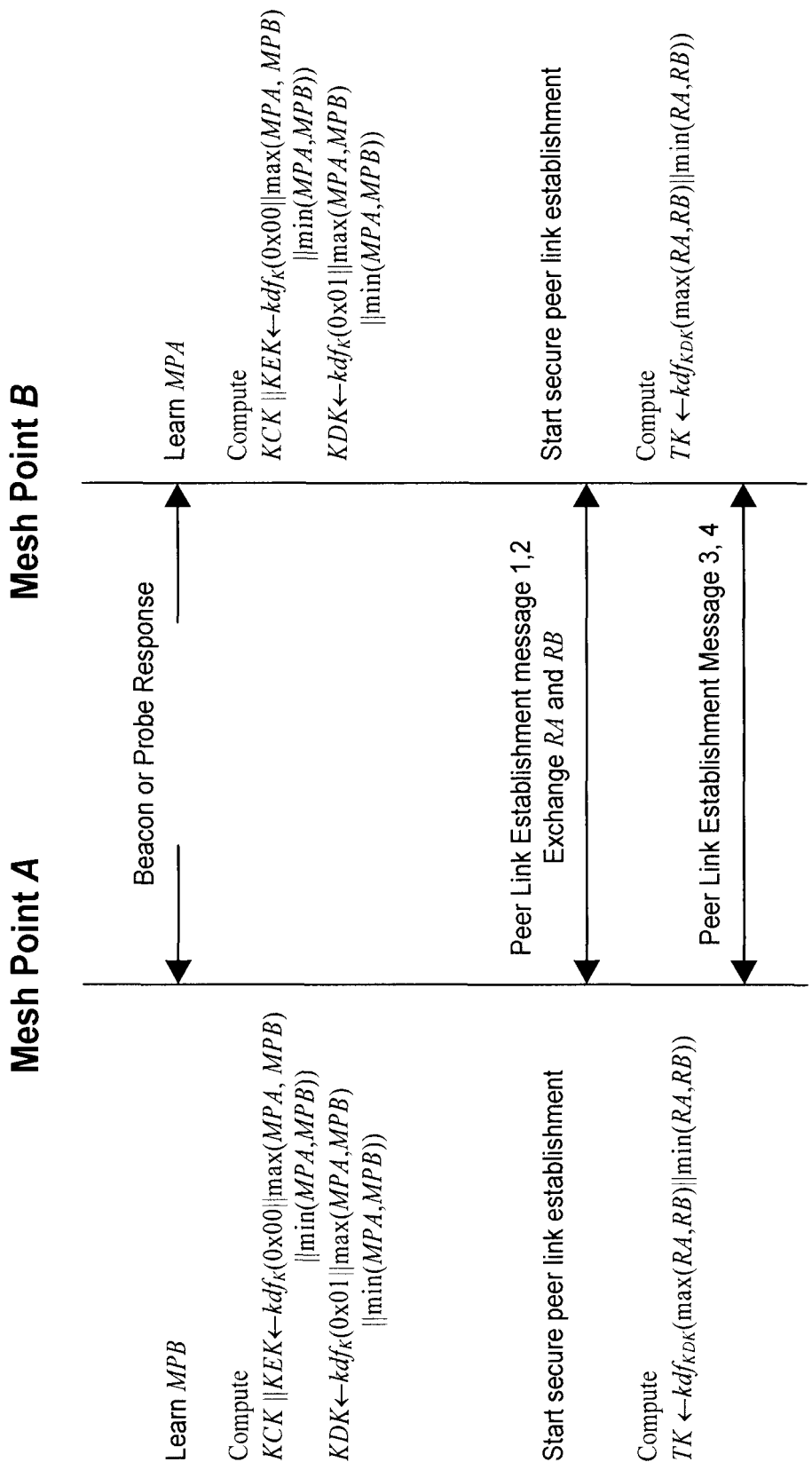
FIG. 2 illustrates one embodiment of link establishment between two points of a mesh network.

The function kdf may be based on a pseudo-random function. This means that it may be computationally infeasible for an adversary to relate two different keys computed by kdf under K, even if the inputs used in the key derivation differ by only a single bit. FIG. 2 illustrates one embodiment of link establishment between two points of a mesh network.

When A or B wishes to establish a secure link with the other, it uses K to compute:

$KCK\|KEK \leftarrow kdf_K(0x00\|max(MPA, MPB)\|min(MPA, MPB))$  $KDK \leftarrow kdf_K(0x01\|max(MPA, MPB)\|min(MPA, MPB))$ Where "a←b" denotes assignment of the expression b to the variable a, "a∥b" denotes the concatenation of a and b, KCK denotes a derived key confirmation key—also known as the authentication key—used during link establishment, KEK denotes a derived key encryption key, used in link establishment to distribute broadcast keys, KDK denotes a derived key derivation key, which will be used to construct a session key established by the mesh link establishment protocol. KDK is used to derive mesh analog of the IEEE 802.11 data encryption key TK in concert with the second message of the mesh link establishment protocol:

$TK \leftarrow kdf_{KDK}(max(RA, RB)\|min(RA, RB))$ where RA is a random bit string provided by A in its first link establishment message and RB a random bit string provided by B in its first link establishment message.

This process binds the derived keys to the MAC addresses MPA and MPB of A and B, respectively. This is an assertion that the derived keys may be used only for communication between A and B. Because the technique described herein assumes that kdf is based on a pseudo-random function, it is computationally infeasible for an adversary to learn anything about one of the keys from any of the others.

To secure the link establishment protocol, it may be advantageous to use the KCK and KEK in the first message, because the protocol operates in the peer-to-peer model. This allows for earlier use of the KCK in IEEE 802.11s meshes to secure link establishment protocol within the peer-to-peer model than is possible with 802.11i key derivation. In one embodiment, the 802.11i key derivation procedure is:

$KCK\|KEK\|TK \leftarrow kdf_K(max(MPA, MPB)\|min(MPA, MPB)\|max(RA, RB)\|min(RA, RB))$ where RA is a random value created by A and RB is a random value created by B. This binds the keys to the link establishment instance.

IEEE 802.11i protocols can feasibly utilize this technique because it is based on the client-server model, where key usage can be deferred until the second link establishment message. This deferral is not possible in the traditional peer-to-peer model. In particular, if key derivation is deferred to the second message in the peer-to-peer model, then it becomes infeasible for A and B to use KCK to mutually authenticate.

Figure 3:
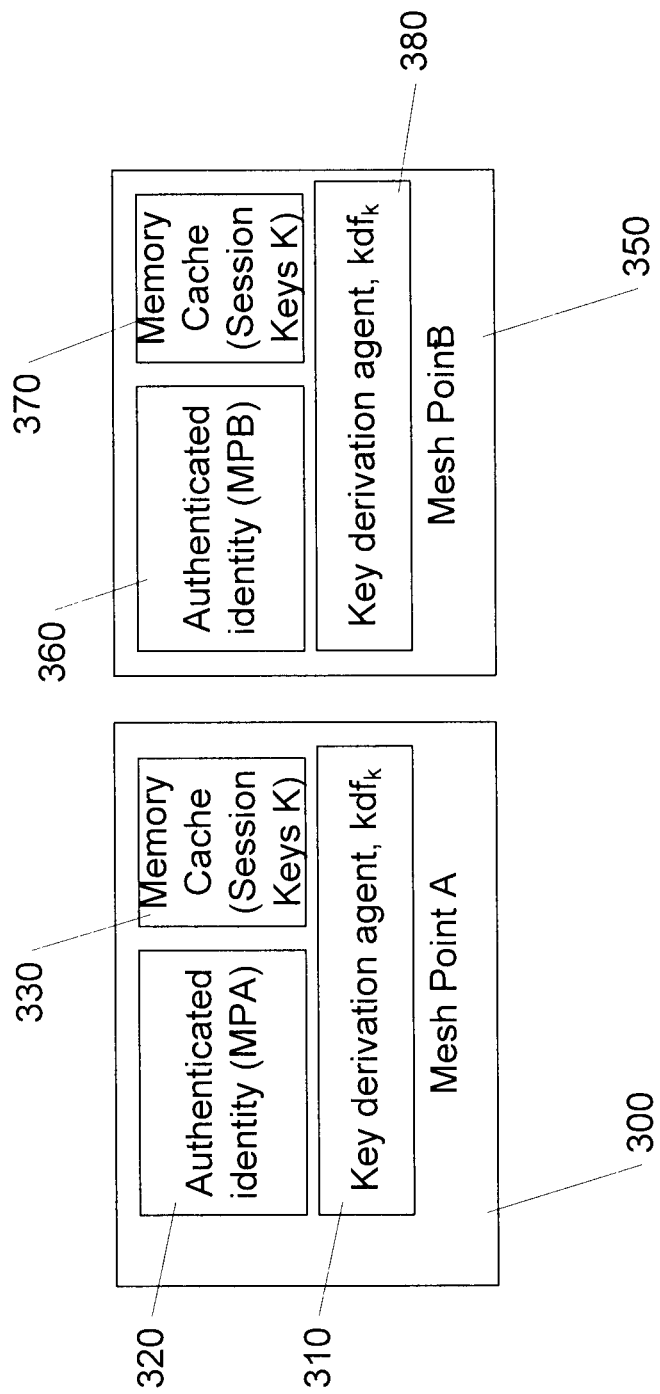
FIG. 3 is a block diagram of one embodiment of two mesh points that may communicate as described herein.

FIG. 3 is a block diagram of one embodiment of two mesh points that may communicate as described herein. Mesh point 300 and mesh point 350 may configured as part of a larger mesh network (not illustrated in FIG. 3) and may communicate utilizing any wireless protocol known in the art, for example, IEEE 802.11 standards.

Each mesh point may include a key derivation agent (310 and 380) that may be utilized to derive a cryptographic key as described above. The key derivation agents may be implemented as hardware, software, firmware or any combination thereof. Each mesh point may also include a cache memory (330 and 370) that may be utilized to store key information to be used as described herein. The cache memories may be communicatively coupled with the corresponding key derivation agent. Each mesh point may further include an authenticated identity (320 and 360) that may be used for secure communications within the mesh network. Each mesh point may further include other components and/or elements, for example, a processor, a storage device, input/output devices, etc. (not illustrated in FIG. 3).

Thus, the techniques described herein may function to separate the construction of the link authentication and key encryption keys from the session encryption key. In IEEE 802.11i all of these keys are derived together. This separation enables security to be overlaid on top of the mesh link establishment protocol. Such an overlay is not feasible using the IEEE 802.11i approach to key derivation, because the mutual authentication is not feasible using the IEEE 802.11i approach in the peer-to-peer model except by increasing the number of link establishment messages beyond four.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for establishing a secure link in a wireless mesh network comprising:
   computing, with a node in a wireless mesh network, one or more cryptographic keys in response to a message having a media access control (MAC) address of a remote node in the mesh network;
   exchanging one or more pseudo random values with the remote node of the mesh network by transmitting at least one message to the remote node as part of a four-message link establishment protocol, wherein a derived key confirmation key (KCK) and a derived key encryption key (KEK) are used in a first message of the four-message link establishment protocol and key usage is deferred until a second link establishment message of the four-message link establishment protocol;
   generating, with the node in a wireless mesh network, a key value based, at least in part, on the one or more cryptographic keys and one or more pseudo random values, wherein generating the key value comprises at least utilization of a concatenation of a maximum of the MAC address for the remote node and a local media access control (MAC) address with a minimum of the local MAC address and the MAC address for the remote node; and
   streaming, in a secure manner utilizing the generated key value, video data with the remote node of the mesh network.

2. The method of claim 1 wherein the message comprises a beacon message.

3. The method of claim 1 wherein the message comprises a probe response message.

4. The method of claim 1 wherein generating a key value based, at least in part, on the one or more cryptographic keys and one or more pseudo random values comprises evaluating:
   $KCK\|KEK \leftarrow kdf_K(0x00\|max(MPA, MPB)\|min(MPA, MPB))$
   where "$\leftarrow$" denotes assignment of the key derivation function ($kdf_K$) expression to the variable $KCK\|KEK$, and further where "$KCK\|KEK$" denotes the concatenation of a derived key confirmation key and a derived key encryption key, used in link establishment to distribute broadcast keys, and "$\|$" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

5. The method of claim 1 wherein generating a key value based, at least in part, on the one or more cryptographic keys and one or more pseudo random values comprises evaluating:
   $KDK \leftarrow kdf_K(0x01\|max(MPA, MPB)\|min(MPA, MPB))$
   where "$\leftarrow$" denotes assignment of the key derivation function ($kdf_K$) expression to the variable KDK, and further where "KDK" denotes a derived key derivation key, to be used to construct a session key established by a mesh link establishment protocol, and "$\|$" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

6. The method of claim 1 wherein generating a key value based, at least in part, on the one or more cryptographic keys and one or more pseudo random values comprises evaluating:
   $KCK\|KEK\|TK \leftarrow kdf_K(max(MPA, MPB)\|min(MPA, MPB)\|max(RA, RB)\|min(RA, RB))$
   where "$\leftarrow$" denotes assignment of the key derivation function ($kdf_K$) expression to the variable $KCK\|KEK\|TK$, and further where "$KCK\|KEK\|TK$" denotes the concatenation of a derived key confirmation key, a derived key encryption key and a data encryption key, RA is a random value created by the remote point of the mesh network and RB is a random value created by a local point of the mesh network, and "$\|$" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

7. An article comprising a tangible computer-readable medium having stored thereon instructions that, when executed by one or more processors, cause the one or more processors to:
   compute, with a node in a wireless mesh network, one or more cryptographic keys in response to a message having a media access control (MAC) address of a remote node in the mesh network;
   exchange one or more pseudo random values with the remote node of the mesh network by transmitting at least one message to the remote node as part of a four-message link establishment protocol, wherein a derived key confirmation key (KCK) and a derived key encryption key (KEK) are used in a first message of the four-message link establishment protocol and key usage is deferred until a second link establishment message of the four-message link establishment protocol;
   generate, with the node in a wireless mesh network, a key value based, at least in part, on the one or more cryptographic keys and one or more pseudo random values, wherein generating the key value comprises at least utilization of a concatenation of a maximum of the MAC address for the remote node and a local media access control (MAC) address with a minimum of the local MAC address and the MAC address for the remote node; and
   stream, in a secure manner utilizing the generated key value, video data with the remote node of the mesh network.

8. The article of claim 7 wherein the message comprises a beacon message.

9. The article of claim 7 wherein the message comprises a probe response message.

10. The article of claim 7 wherein the instructions that cause the one or more processors to generate a key value based, at least in part, on the one or more cryptographic keys and one or more pseudo random values comprise instructions that cause the one or more processors to evaluate:
    $KCK\|KEK \leftarrow kdf_K(0x00\|max(MPA, MPB)\|min(MPA, MPB))$
    where "$\leftarrow$" denotes assignment of the key derivation function ($kdf_K$) expression to the variable $KCK\|KEK$, and further where "$KCK\|KEK$" denotes the concatenation of a derived key confirmation key and a derived key encryption key, used in link establishment to distribute broadcast keys, and "$\|$" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

11. The article of claim 7 wherein the instructions that cause the one or more processors to generate a key value based, at least in part, on the one or more cryptographic keys and one or more pseudo random values comprise instructions that cause the one or more processors to evaluate:

$KDK \leftarrow kdf_K(0x01 \| max(MPA, MPB) \| min(MPA, MPB))$ where "←" denotes assignment of the key derivation function ($kdf_K$) expression to the variable KDK, and further where "KDK" denotes a derived key derivation key, to be used to construct a session key established by a mesh link establishment protocol, and "∥" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

12. The article of claim 7 wherein the instructions that cause the one or more processors to generate a key value based, at least in part, on the one or more cryptographic keys and one or more pseudo random values comprise instructions that cause the one or more processors to evaluate:

$KCK \| KEK \| TK \leftarrow kdf_K(max(MPA, MPB) \| min(MPA, MPB) \| max(RA, RB) \| min(RA, RB))$ where "←" denotes assignment of the key derivation function ($kdf_K$) expression to the variable KCK∥KEK∥TK, and further where "KCK∥KEK∥TK" denotes the concatenation of a derived key confirmation key, a derived key encryption key and a data encryption key, RA is a random value created by the remote point of the mesh network and RB is a random value created by a local point of the mesh network, and "∥" represents a concatenation, "max(MPA, MPB)" represents the larger of MPA and MPB, and "min(MPA, MPB)" represents the lesser of MPA and MPB, where MPA represents an address of the remote node and MPB represents an address of the local node.

\* \* \* \* \*